US009218092B2

(12) United States Patent
Jeon et al.

(10) Patent No.: US 9,218,092 B2
(45) Date of Patent: Dec. 22, 2015

(54) CURVED TOUCH SCREEN PANEL AND METHOD OF MANUFACTURING THE SAME

(75) Inventors: Byeong-Kyu Jeon, Yongin (KR); Sung-Ku Kang, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 1270 days.

(21) Appl. No.: 12/929,710

(22) Filed: Feb. 10, 2011

(65) Prior Publication Data
US 2011/0273383 A1    Nov. 10, 2011

(30) Foreign Application Priority Data

May 10, 2010  (KR) ......................... 10-2010-0043507

(51) Int. Cl.
*G06F 3/041* (2006.01)
*G06F 3/044* (2006.01)

(52) U.S. Cl.
CPC ...... *G06F 3/044* (2013.01); *G06F 2203/04103* (2013.01)

(58) Field of Classification Search
CPC ............................................ G06F 2203/04102
USPC ................................ 361/807; 65/30.1–30.14
See application file for complete search history.

(56) References Cited

U.S. PATENT DOCUMENTS

| 3,218,220 | A | | 11/1965 | Weber | |
|---|---|---|---|---|---|
| 5,733,622 | A | * | 3/1998 | Starcke et al. | 428/64.1 |
| 7,030,860 | B1 | * | 4/2006 | Hsu et al. | 345/173 |
| 2009/0015747 | A1 | * | 1/2009 | Nishizawa et al. | 349/58 |
| 2009/0161048 | A1 | | 6/2009 | Satake et al. | |
| 2009/0290113 | A1 | | 11/2009 | Nakahata et al. | |
| 2010/0119846 | A1 | | 5/2010 | Sawada | |
| 2011/0019123 | A1 | * | 1/2011 | Prest et al. | 349/58 |

FOREIGN PATENT DOCUMENTS

| GB | 2078169 A | * | 1/1982 |
|---|---|---|---|
| JP | 2007-279819 A | | 10/2007 |
| KR | 10 2006-0044474 A | | 5/2006 |
| KR | 10 2007-0011565 A | | 1/2007 |
| KR | 10-0894310 B1 | | 4/2009 |
| KR | 10 2010-000697 A | | 1/2010 |
| TW | 200902467 A | | 1/2009 |

OTHER PUBLICATIONS

Korean Office Action in KR 10-2010-0043507, dated Jan. 19, 2012 (Jeon, et al.).
Korean Office Action in KR 10-2010-0043507, dated Jun. 29, 2011 (Jeon, et al.).
Taiwanese Office Action Dated Sep. 24, 2015.

* cited by examiner

*Primary Examiner* — Carolyn R Edwards
(74) *Attorney, Agent, or Firm* — Lee & Morse, P.C.

(57) ABSTRACT

A touch screen panel and a method of manufacturing the same, the touch screen panel including a curved substrate; sensing patterns on at least one surface of the curved substrate; and an insulating layer covering the sensing patterns.

13 Claims, 3 Drawing Sheets

Display Panel Direction

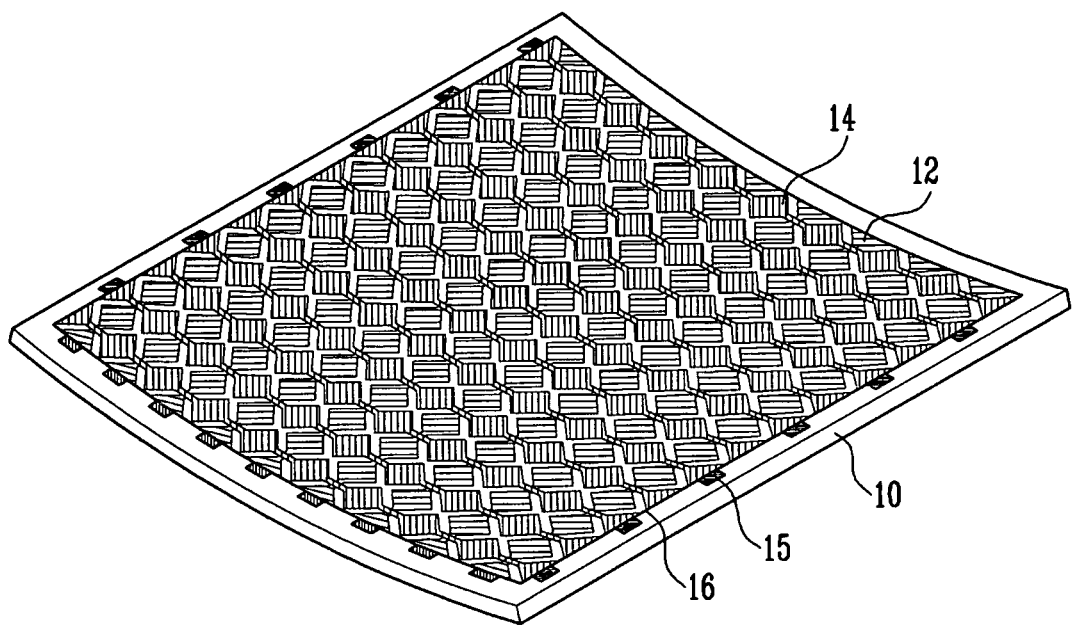
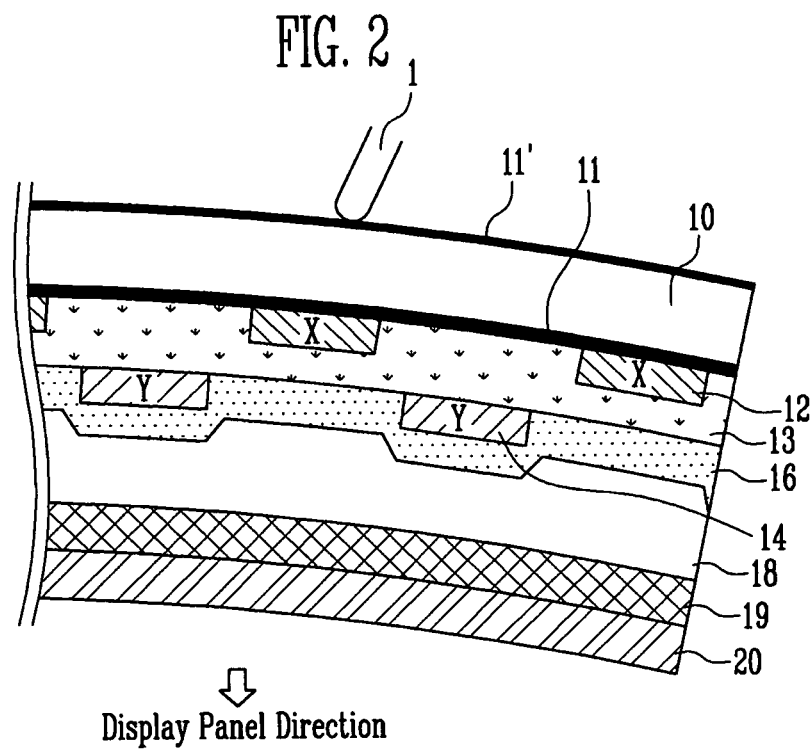

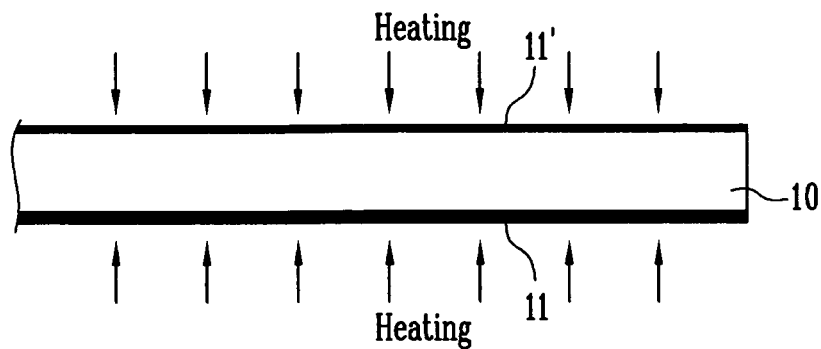
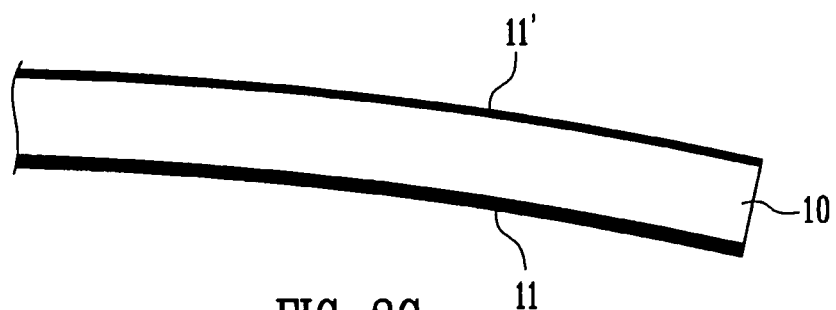
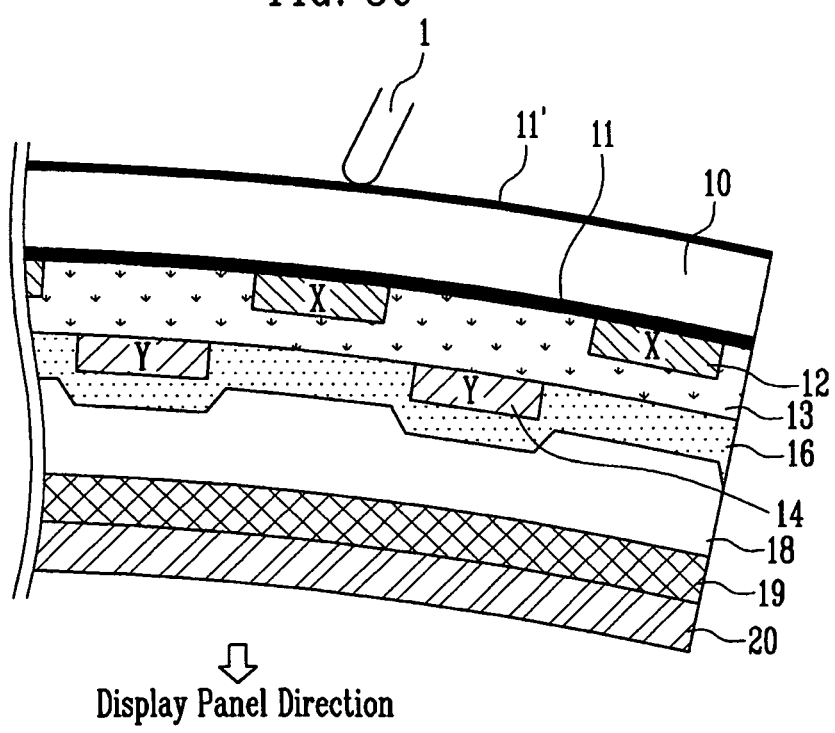

CURVED TOUCH SCREEN PANEL AND METHOD OF MANUFACTURING THE SAME

BACKGROUND

1. Field

Embodiments relate to a touch screen panel and a method of manufacturing the same.

2. Description of the Related Art

A touch screen panel is an input device capable of selecting content displayed on the screen of an image display device by a human hand or an object to input the command of a user.

The touch screen panel may be provided on a front face of the image display device to convert a contact position of the human hand or the object into an electrical signal. Thus, an instruction contact selected in the contact position may be received as an input signal.

Since the touch screen panel may replace an additional input device coupled to the image display device, e.g., a keyboard and a mouse, the use range is gradually increasing.

In particular, recently, research on forming the touch screen panel not only on a flat plane but also on a curved surface having a predetermined curvature has been performed.

Typically, in order to realize a curved touch screen panel, sensing cells may be formed on a transparent substrate made of, e.g., flexible polyethylene terephthalate (PET).

SUMMARY

Embodiments are directed to a touch screen panel and a method of manufacturing the same, which represents advances over the related art.

It is a feature of an embodiment to provide a touch screen panel obtained by asymmetrically performing a chemical enhancing process on the surface of a glass substrate to realize a curved glass substrate having a predetermined curvature and by forming sensing cells on one surface of the curved glass substrate.

At least one of the above and other features and advantages may be realized by providing a touch screen panel including a curved substrate; sensing patterns on at least one surface of the curved substrate; and an insulating layer covering the sensing patterns.

The curved substrate may be a curved glass substrate.

The touch screen panel may further include a chemical enhancing layer on at least one of a first surface and a second surface of the curved glass substrate.

The chemical enhancing layer may be a first chemical enhancing layer on the first surface of the curved glass substrate, the touch screen panel may further include a second chemical enhancing layer on the second surface of the curved glass substrate, and a thickness of the first chemical enhancing layer may be different from a thickness of the second chemical enhancing layer.

The thickness of the first chemical enhancing layer may be greater than the thickness of the second chemical enhancing layer, and the curved glass substrate may be curved in a first direction toward the first chemical enhancing layer.

The sensing patterns may be on the first surface of the curved glass substrate.

The curved substrate may constitute a window for a display device, and the first surface of the curved glass substrate may face a display panel of the display device.

The first chemical enhancing layer may be on only one of the first surface and the second surface of the curved glass substrate, and the sensing patterns may be on the surface including the chemical enhancing layer.

The touch screen panel may further include an adhesive layer on one surface of the insulating layer, and a ground electrode layer facing the insulating layer.

The chemical enhancing layer may be realized by a Na component existing on the surface of the curved glass substrate being replaced by a K component.

At least one of the above and other features and advantages may also be realized by providing a method of manufacturing a touch screen panel, the method including providing a glass substrate having a first surface and a second surface; performing a chemical enhancing process to form a chemical enhancing layer on at least one of the first surface and the second surface of the glass substrate to form a chemical enhancing layer such that the glass substrate is curved in a direction of the at least one surface on which the chemical enhancing layer is formed or in a direction of a surface having a relatively thicker chemical enhancing layer so that a curved glass substrate is realized; forming sensing patterns on one of the first and second surfaces of the curved glass substrate; and forming an insulating layer to cover the sensing patterns.

The chemical enhancing process may be performed on both the first surface and the second surface to form a first chemical enhancing layer and a second chemical enhancing layer, respectively, and thicknesses of first and second chemical enhancing layers may be different from each other.

Performing the chemical enhancing process may be carried out such that the thickness of the first chemical enhancing layer is larger than the thickness of the second chemical enhancing layer, and the curved glass substrate is curved in the direction of the first surface having the first chemical enhancing layer thereon.

The method may further include sequentially forming an adhesive layer and a ground electrode layer on one surface of the insulating layer.

Performing the chemical enhancing process may include exposing one surface of the glass substrate to a $KNO_3$ solution, and heating the glass substrate at a temperature of about 400° C. to about 450° C. for about 15 to about 18 hours.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 illustrates a perspective view of a curved touch screen panel according to an embodiment;

FIG. 2 illustrates a sectional view of a main part of the touch screen panel of FIG. 1;

FIGS. 3A to 3C illustrate sectional views of stages in a method of manufacturing a touch screen panel according to an embodiment.

DETAILED DESCRIPTION

Figure 4:
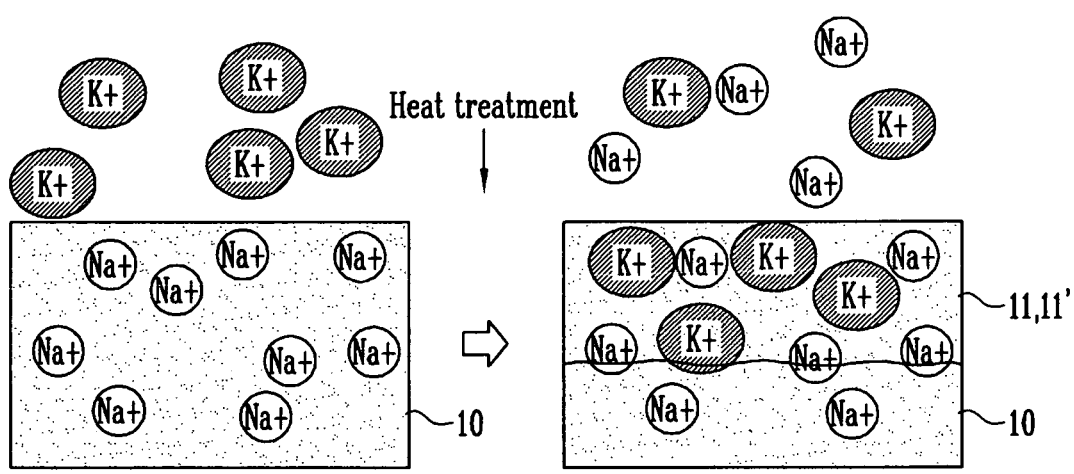
FIG. 4 illustrates a view of the chemical enhancing process of FIGS. 3A and 3B in detail.

Korean Patent Application No. 10-2010-0043507, filed on May 10, 2010, in the Korean Intellectual Property Office, and entitled: "Curved Touch Screen Panel and Fabricating Method for the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a perspective view of a curved touch screen panel according to an embodiment.

Referring to FIG. 1, the touch screen panel according to the present embodiment may include a plurality of sensing patterns 12 and 14 on a curved glass substrate 10, an optional first insulating layer 13 between the sensing patterns, metal patterns 15 for coupling the sensing patterns 12 and 14 to position detecting lines (not illustrated), and a second insulating layer 16 covering the sensing patterns 12 and 14. The curved glass substrate 10 may be curved by performing a chemical enhancing process on at least one surface thereof or by asymmetrically performing a chemical enhancing process on both surfaces thereof to have a predetermined curvature As illustrated in FIG. 1, the sensing patterns 12 and 14, the metal patterns 15, and the insulating layer 16 may be formed on an internal surface of the curved glass substrate. However, the embodiments are not limited to the above.

The sensing patterns 12 and 14 may be alternately arranged and may include X sensing patterns 12 and Y sensing patterns 14 disposed such that the X coordinates are coupled to each other in the same column and/or the Y coordinates are coupled to each other in the same row.

For example, the X sensing patterns 12 may include a plurality of X patterns in which the X coordinates are formed so that the sensing patterns arranged in the same column are coupled to each other in a first direction (a column direction). The Y sensing patterns 14 may include a plurality of Y patterns in which the Y coordinates are formed so that the sensing patterns arranged in the same row are coupled to each other in a second direction (a row direction).

The X and Y sensing patterns 12 and 14 may be formed in different layers with the first insulating layer 13 (see FIG. 2) interposed therebetween.

In this case, the X sensing patterns 12 may be patterned to be coupled in the first direction and the Y sensing patterns 14 may be patterned to be coupled in the second direction. Therefore, processes of forming additional contact holes and coupling patterns may be omitted so that a number of masks may be reduced and processes may be simplified.

However, the embodiments not limited to the above.

For example, the X and Y sensing patterns 12 and 14 may be formed in the same layer. In this case, kind of sensing patterns between the X and Y sensing patterns 12 and 14 may be coupled in the first or second direction in the patterning process and the remaining sensing patterns may be coupled to each other in the first or second direction in forming the contact holes and the coupling patterns.

The metal patterns 15 may be arranged at an edge of the substrate 10 where the X and Y sensing patterns 12 and 14 are formed to couple the X and Y sensing patterns 12 and 14 to position detecting lines (not illustrated).

To be specific, the metal patterns 15 may electrically couple the X and Y sensing patterns 12 and 14 in respective columns or rows to the position detecting lines so that contact position detecting signals may be supplied to a driving circuit.

The second insulating layer 16 may be formed of, e.g., a transparent insulating material, and may cover the sensing patterns 12 and 14.

When the touch screen panel, e.g., an electrostatic capacity touch screen panel, contacts an object such as a human hand or a touch stick, a change in electrostatic capacity in accordance with a contact position may be transmitted from the sensing patterns 12 and 14 to a driving circuit via the metal patterns 15 and the position detecting lines. The change in the electrostatic capacity may be converted into an electrical signal by an X and Y input processing circuit (not illustrated) so that the contact position may be determined.

The chemical enhancing process may be performed on at least one surface of the glass substrate on which the sensing patterns 12 and 14 are formed.

That is, according to the present embodiment, the chemical enhancing process may be performed on one of the first surface or the second surface of the glass substrate to realize a curved glass substrate having a predetermined curvature so that the surface on which the chemical enhancing process is performed may become an internal circumference. In an alternative implementation, the chemical enhancing process may be asymmetrically performed on both the first and second surfaces of the glass substrate to realize a glass substrate having a predetermined curvature so that the surface on which a relatively thick chemical enhancing layer is formed becomes the internal circumference.

When the chemical enhancing layer is formed on both surfaces of the glass substrate, since the chemical enhancing process may be advantageous to secure additional strength, it is preferable to asymmetrically perform the enhancing process on both surfaces of the glass substrate.

The glass substrate on which the chemical enhancing process is performed may perform the function of a window of a display device. In this case, the sensing patterns 12 and 14 may be arranged in a direction of, i.e., toward, a display panel (not illustrated).

When a thickness of the chemical enhancing layer of the first surface of the curved glass substrate is greater than a thickness of the chemical enhancing layer of the second surface, the curved glass substrate may be curved in the direction of the first surface. That is, the second surface may become an external circumference of the curved glass substrate.

According to the present embodiment, the sensing patterns 12 and 14, the metal patterns 15, and the second insulating layer 16 may be formed on the internal circumference of the curved glass substrate, i.e., on the first surface.

Thus, when the curved glass substrate functions as a window of the display device, the first surface of the curved glass substrate may be provided in the direction of, i.e., may face, the display panel and the contact surface on which touch is performed may become the second surface of the curved glass substrate.

Therefore, the second surface of the curved glass substrate 10 may be the contact surface that contacts an object and performs as the window of the display device. In this case, an additional window may not be provided; and the glass substrate 10 of the touch screen panel and the window may be integrated with each other. Therefore, it is possible to provide a thin touch screen panel and to improve manufacturing efficiency by simplifying manufacturing processes and by reducing material cost.

In addition, the contact surface may be curved so that the touch screen panel may be applied to various applications that may be expressed as a curved surface.

In this case, since the display panel may be a curved display having the same curvature as the glass substrate, the display panel is preferably realized by a flexible display panel.

FIG. 2 illustrates a sectional view of a main part of the touch screen panel according to an embodiment.

FIG. 2 illustrates an embodiment in which the glass substrate that is asymmetrically chemical enhancing processed to have a predetermined curvature is used as a window.

Referring to FIG. 2, the touch screen panel according to the present embodiment may include the sensing patterns 12 and 14, the second insulating layer 16, a first adhesive layer 18, a buffering film 19, and a ground electrode layer 20 sequentially formed on one surface of the curved glass substrate 10 on whose at least one surface the chemical enhancing process is performed or on whose both surfaces the chemical enhancing process is asymmetrically performed to have a predetermined curvature.

As the curved glass substrate may function as a window, the first surface of the curved glass substrate 10, i.e., the surface on which the chemical enhancing process is performed to a greater degree may be provided in the direction of, i.e., may face, the display panel. The contact surface on which touch is to be performed may become the second surface of the curved glass substrate, i.e., the surface on which the chemical enhancing process is performed to a lesser degree. In particular, performing the chemical enhancing process to a greater degree may include heating to a higher temperature and/or performing the process for a longer period of time than when performing the chemical enhancing process to a lesser degree.

That is, in the present embodiment, a relatively thick first chemical enhancing layer 11 may be formed on the first surface of the glass substrate 10 and a relatively thin second chemical enhancing layer 11' may be formed on the second surface of the glass substrate 10.

Thus, the first surface on which the sensing patterns 12 and 14, the second insulating layer 16, the first adhesive layer 18, and the ground electrode layer 20 are formed may be provided in the direction of, i.e., may face, the display panel; and the second surface may be provided in a direction where an object 1 makes a contact.

As described above, the sensing patterns 12 and 14 may be alternately provided in different layers with the first insulating layer 13 made of a transparent material interposed therebetween. However, the embodiments are not limited to the above. In an implementation, the sensing patterns 12 and 14 may be arranged in the same layer and/or may include the first insulating layer 13 therebetween.

The sensing patterns 12 and 14 may be formed of a transparent electrode material, e.g., ITO, so that light emitted from the display panel provided under the touch screen panel may pass through the touch screen panel. The sensing patterns 12 and 14 may be covered by the second insulating layer 16 made of the transparent insulating material as described above.

The first adhesive layer 18 may be formed between the second insulating layer 16 and the ground electrode layer 20 to attach the second insulating layer 16 and the ground electrode layer 20 to each other. The first adhesive layer 18 may be made of a transparent adhesive material having a high light transmittance. For example, the first adhesive layer 18 may be formed of super view resin (SVR) or optically clear adhesive (OCA).

The ground electrode layer 20 may be formed of the transparent electrode material, e.g., ITO, and may face the second insulating layer 16 with the first adhesive layer 18 interposed therebetween. The ground electrode layer 20 may secure stability between the touch screen panel and the display panel. According to a method of designing the touch screen panel, the ground electrode layer 20 may be used for forming electrostatic capacity together with the sensing patterns 12 and 14.

That is, in the touch screen panel of an electrostatic capacity type, in order to sense the contact position, electrostatic capacity between the X and Y sensing patterns 12 and 14 and the ground electrode layer 20 may be used.

A buffering film 19 may be further formed between the first adhesive layer 18 and the ground electrode layer 20. That is, the buffering film 19 may be formed on a bottom surface (a surface facing the display panel) of the first adhesive layer 18 to be attached to the touch screen panel, may be formed between the first adhesive layer 18 and the ground electrode layer 20, and may be made of a polymer material, e.g., polyethylene terephthalate (PET), to prevent scattering or shattering and to improve durability of the touch screen panel. Furthermore, the buffering film 19 may improve sensitivity of the touch screen panel.

To be specific, when the buffering film 19 is provided, a distance between the sensing patterns 12 and 14 and the ground electrode layer 20 may increase so that electrostatic capacity between the sensing patterns 12 and 14 and the ground electrode layer 20 is reduced. Therefore, since the touch screen panel may more sensitively react with respect to the same degree of contact, a highly sensitive touch screen panel may be realized.

In an implementation, the ground electrode layer 20 may not be provided in the touch screen panel but may be provided on a surface of the display panel coupled to the touch screen panel.

In this case, since the display panel is to be the curved display having the same curvature as the curved glass substrate, the display panel is preferably realized by a flexible display panel.

According to an embodiment, the chemical enhancing process may be performed on at least one surface of the glass substrate 10.

The chemical enhancing process may be performed on the glass substrate 10 by exposing an external surface of the glass substrate to a $KNO_3$ solution and by heating the glass substrate at a temperature of about 400° C. to about 450° C. for about 15 to about 18 hours. A Na component existing on the surface of the glass substrate may thus be replaced by a K component through such a process so that the strength of the surface of the glass substrate may be improved.

That is, in the chemical enhancing layer 11 formed on the surface of the glass substrate 10 on which the enhancing process is performed, the Na component existing on the surface may be replaced by the K component so that the strength is improved.

In this case, the curved glass substrate having a predetermined curvature may be realized in accordance with a difference in thicknesses of the chemical enhancing layers 11 and 11' formed on the external surface of the glass substrate.

To be specific, when the chemical enhancing layers 11 and 11' formed by exchanging ions as described above are formed on both surfaces of the glass substrate so that the thicknesses of the chemical enhancing layers 11 and 11' are different from each other, i.e., when the thicknesses of the chemical enhancing layers on both surfaces are different from each other, stress generated on the surface of the glass substrate and cohesive force/condensing force between structures in the glass substrate may be different.

Therefore, the glass substrate 10 may be curved in the direction where stress is concentrated. The curvature may be controlled by controlling the thicknesses of the chemical enhancing layers 11 and 11'.

For example, when the thickness of the first chemical enhancing layer 11 of the first surface of the glass substrate is greater than the thickness of the second chemical enhancing layer 11' of the second surface, the glass substrate 10 may be curved in the direction of the first surface. That is, the second surface may become the external circumference of the glass substrate.

The curved glass substrate may be realized when the chemical enhancing process is performed only on the second surface of the glass substrate.

Processes of manufacturing the curved touch screen panel according to the present embodiment will be described in detail with reference to FIGS. 3 and 4.

FIGS. 3A to 3C illustrate sectional views of stages in a method of manufacturing the touch screen panel according to an embodiment. FIG. 4 illustrates a view of the chemical enhancing process of FIGS. 3A and 3B in detail.

As illustrated in FIGS. 3A to 3C, the chemical enhancing process may be asymmetrically performed on both surfaces of the glass substrate and the curved glass substrate realized thus is used to be integrated with a window.

In FIGS. 3A to 3C, for convenience sake, only one end area of the touch screen panel is illustrated.

As illustrated in FIG. 3A, the chemical enhancing process may be asymmetrically performed on the first and second surfaces of the glass substrate 10 to form the first chemical enhancing layer 11 and the second chemical enhancing layer 11' having different thicknesses.

The chemical enhancing process may be performed on the glass substrate 10 by exposing the first surface and/or the second surface of the glass substrate to the $KNO_3$ solution and by heating the first surface and/or the second surface at the temperature of about 400° C. to about 450° C. for about 15 to about 18 hours. The Na component existing on the surface of the glass substrate 10 may be replaced by the K component through such a process so that the strength of the surface of the glass substrate may be improved as illustrated in FIG. 4.

That is, in the first and second chemical enhancing layers 11 and 11' on the surface of the glass substrate 10 on which the enhancing process is performed, the Na component existing on the surface may be replaced by the K component.

In this case, the curved glass substrate having a predetermined curvature may be realized in accordance with a difference in thicknesses of the first and second chemical enhancing layers 11 and 11' on the external surface of the glass substrate 10 as illustrated in FIG. 3B.

To be specific, when the first and second chemical enhancing layers 11 and 11' formed by exchanging ions as described above are formed on both surfaces of the glass substrate so that the thicknesses of the chemical enhancing layers 11 and 11' are different from each other, that is, when the thicknesses of the chemical enhancing layers on both surfaces are different from each other, stress generated on the surface of the glass substrate and cohesive force/condensing force between structures in the glass substrate may be different.

Therefore, the glass substrate may be curved in the direction where stress is concentrated. The curvature may be controlled by controlling the thicknesses of the chemical enhancing layers.

For example, when the thickness of the first chemical enhancing layer 11 of the first surface of the glass substrate is greater than the thickness of the second chemical enhancing layer 11' of the second surface, the glass substrate 10 may be curved in the direction of the first surface. That is, the second surface may become the external circumference of the glass substrate.

When the chemical enhancing processed curved glass substrate is realized, the sensing patterns of the touch screen panel may be formed on one surface of the curved glass substrate.

According to an embodiment, the sensing patterns may be formed on the internal circumference, i.e., the first surface of the curved glass substrate.

That is, as illustrated in FIG. 3C, the X sensing patterns 12, the first insulating layer 13, the Y sensing patterns 14, the second insulating layer 16, the first adhesive layer 18, the buffering film 19, and the ground electrode layer 20 may be sequentially formed on the internal circumference of the curved glass substrate.

To be specific, after a layer is formed of the transparent electrode material, e.g., ITO, the layer may be patterned to form the X sensing patterns 12. The coupling parts of the X sensing patterns 12 are not illustrated. However, the X sensing patterns 12 may be patterned to be coupled in the first direction (e.g., the column direction) in cell unit areas.

Then, a first insulating material may be printed on the X sensing patterns 12 using a printing method in which relatively easy processes may be performed, and annealing may be performed to form the first insulating layer 13. Forming the first insulating layer 13 by the printing method is an example embodiment and is not limited to the above. For example, the first insulating layer 13 may be formed by chemical vapor deposition (CVD) or sputtering.

Then, a layer may be formed on the first insulating layer 13 of the transparent electrode material, e.g., ITO, and may be patterned to form the Y sensing patterns 14. The Y sensing patterns 14 may be arranged not to overlap the X sensing patterns 12 (The coupling parts of the Y sensing patterns 14 may be excluded). Then, although not shown, the Y sensing patterns 14 may be patterned to be coupled in the second direction (e.g., the row direction). In an implementation, after forming the Y sensing patterns 14, the metal patterns 15 illustrated in FIG. 1 and position detecting lines (not shown) may be further formed of a low resistance material having lower surface resistance than the transparent electrode material, e.g., a triple layer of Mo/Al/Mo or a Cr layer.

Then, a second insulating material may be printed on the Y sensing patterns 14 and the metal patterns 15 using the printing method to form the second insulating layer 16. However, the method of forming the second insulating layer 16 is not limited to the printing method and the second insulating layer 16 may be formed using, e.g., CVD or sputtering.

Then, the first adhesive layer 18, the buffering film 19, and the ground electrode layer 20 may be sequentially formed on the second insulating layer 16.

At this time, the first adhesive layer 18 may be formed of a transparent adhesive material having high light transmittance, e.g., super view resin (SVR) or optically clear adhesive (OCA).

The ground electrode layer 20 formed of the transparent electrode material, e.g., ITO, may be used for securing stability between the touch screen panel and the display panel and may be used for forming electrostatic capacity with the sensing patterns 12 and 14 in the method of designing the touch screen panel. That is, in the touch screen panel of an electrostatic capacity type, electrostatic capacity between the X and Y sensing patterns 12 and 14 and the ground electrode layer 20 may be used in order to sense the contact position.

The buffering film 19 may be formed of the polymer material, e.g., PET, between the first adhesive layer 18 and the ground electrode layer 20 to prevent scattering or shattering, to improve the durability of the touch screen panel, and to improve the sensitivity of the touch screen panel.

When forming a curved display device according to an embodiment, sufficient strength of the touch screen panel may be achieved so that reliability is maintained while also realizing the curved touch screen panel.

According to an embodiment, the chemical enhancing process may be asymmetrically performed on the surface of the glass substrate to realize the curved glass substrate having a predetermined curvature and the sensing cells may be formed on one surface of the curved glass substrate. Therefore, the curved touch screen panel whose reliability is secured may be realized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
    a curved glass substrate;
    sensing patterns on at least one of a bottom surface and a top surface of the curved glass substrate;
    an insulating layer covering the sensing patterns;
    a first chemical enhancing layer on the bottom surface of the curved glass substrate; and
    a second chemical enhancing layer on the top surface of the curved glass substrate, wherein:
    a thickness of the first chemical enhancing layer is different from a thickness of the second chemical enhancing layer, and
    the first and second chemical enhancing layers are curved along with the curved glass substrate and face each other.

2. The touch screen panel as claimed in claim 1, wherein:
    the thickness of the first chemical enhancing layer is greater than the thickness of the second chemical enhancing layer, and
    the curved glass substrate is curved in a first direction toward the first chemical enhancing layer.

3. The touch screen panel as claimed in claim 2, wherein the sensing patterns are on the bottom surface of the curved glass substrate.

4. The touch screen panel as claimed in claim 3, wherein:
    the curved glass substrate constitutes a window for a display device, and
    the bottom surface of the curved glass substrate faces a display panel of the display device.

5. The touch screen panel as claimed in claim 1, wherein the first and second chemical enhancing layers are realized by a Na component existing on the bottom and top surfaces of the curved glass substrate being replaced by a K component.

6. The touch screen panel as claimed in claim 1, further comprising:
    an adhesive layer on one surface of the insulating layer, and
    a ground electrode layer facing the insulating layer.

7. A method of manufacturing a touch screen panel, the method comprising:
    providing a glass substrate having a first bottom surface and a top surface;
    performing a chemical enhancing process to form a first chemical enhancing layer on the bottom surface of the glass substrate and a second chemical enhancing layer on the top surface of the glass substrate such that the glass substrate is curved in a direction of the at least one of the first chemical enhancing layer and the second chemical enhancing layer to form a curved glass substrate;
    forming sensing patterns on one of the bottom and top surfaces of the curved glass substrate; and
    forming an insulating layer to cover the sensing patterns, wherein:
    thicknesses of the first and second chemical enhancing layers are different from each other, and
    the first and second chemical enhancing layers are curved along with the curved glass substrate and face each other.

8. The method as claimed in claim 7, wherein performing the chemical enhancing process is carried out such that:
    the thickness of the first chemical enhancing layer is larger than the thickness of the second chemical enhancing layer, and
    the curved glass substrate is curved in the direction of the bottom surface having the first chemical enhancing layer thereon.

9. The method as claimed in claim 7, further comprising sequentially forming an adhesive layer and a ground electrode layer on one surface of the insulating layer.

10. The method as claimed in claim 7, wherein performing the chemical enhancing process includes:
    exposing one surface of the glass substrate to a $KNO_3$ solution, and
    heating the glass substrate at a temperature of about 400° C. to about 450° C. for about 15 to about 18 hours.

11. The touch screen panel as claimed in claim 1, wherein the curved glass substrate has a predetermined curvature, which is caused by force generated by thickness difference between the first and second chemical enhancing layers.

12. The touch screen panel as claimed in claim 1, wherein the curved glass substrate is a thin plate, which is curved in a vertical direction of the thin plate.

13. The touch screen panel as claimed in claim 1, wherein the second chemical enhancing layer is to be contacted by an object for sensing.

* * * * *